United States Patent [19]
Greenwood

[11] Patent Number: 6,071,209
[45] Date of Patent: Jun. 6, 2000

[54] CONTINUOUSLY-VARIABLE-RATIO TRANSMISSION OF THE TOROIDAL-RACE-ROLLING TRACTION TYPE

[75] Inventor: Christopher John Greenwood, Preston, United Kingdom

[73] Assignee: Torotrak (Development) Limited, London, United Kingdom

[21] Appl. No.: 08/973,846

[22] PCT Filed: Jun. 19, 1996

[86] PCT No.: PCT/GB96/01465

§ 371 Date: Dec. 19, 1997

§ 102(e) Date: Dec. 19, 1997

[87] PCT Pub. No.: WO97/01718

PCT Pub. Date: Jan. 16, 1997

[30] Foreign Application Priority Data

Jun. 28, 1995 [GB] United Kingdom .................... 9513141

[51] Int. Cl.[7] ................................................ F16H 15/38
[52] U.S. Cl. ................................................ 476/10; 476/40
[58] Field of Search ................................. 476/10, 40, 41

[56] References Cited

U.S. PATENT DOCUMENTS

| | | | |
|---|---|---|---|
| 1,999,543 | 4/1935 | Madle | 476/41 |
| 2,125,999 | 8/1938 | Erban | 476/40 |
| 2,446,409 | 8/1948 | Chilton | 476/10 |
| 3,153,938 | 10/1964 | Brie Perry | 476/40 |
| 3,267,756 | 8/1966 | Brie Perry et al. | 476/40 |
| 3,823,613 | 7/1974 | Abbott | 476/40 |
| 3,993,054 | 11/1976 | Iseman | 74/200 |
| 4,281,559 | 8/1981 | Sharpe | 476/10 |
| 5,395,292 | 3/1995 | Fellows et al. | 476/10 |
| 5,564,993 | 10/1996 | Robinson | 476/10 |

FOREIGN PATENT DOCUMENTS

| | | |
|---|---|---|
| 0 413 342 A1 | 2/1991 | European Pat. Off. . |
| 1134202 | 11/1968 | United Kingdom . |
| 1500763 | 2/1978 | United Kingdom . |
| WO 92/11475 | 7/1992 | WIPO . |

*Primary Examiner*—Tamara L. Graysay
*Assistant Examiner*—William C. Joyce
*Attorney, Agent, or Firm*—Davis and Bujold

[57] ABSTRACT

A roller control system for a continuously-variable-ratio transmission (CVT) of the toroidal-race rolling-traction type. The system includes an operating mechanism having a first part (5, 6) operable to control the position of the roller center along the torus center circle but incapable of defining the tilt angle (36) adopted by the roller (7), and a second part comprising a mechanical link (13) connected to the roller bearings and operable to control the tilt angle (36). The link (13) lies substantially parallel to the plane of the roller (7) and is constrained to pass through a predetermined single point (14).

7 Claims, 2 Drawing Sheets

CONTINUOUSLY-VARIABLE-RATIO TRANSMISSION OF THE TOROIDAL-RACE-ROLLING TRACTION TYPE

This application is a continuation of International Application No. PCT/GB96/01465 filed on Jun. 19, 1996.

BACKGROUND OF THE INVENTION

This invention relates to continuously-variable ratio transmissions ("CVT's") of the toroidal-race rolling-traction type and especially to means for controlling the orientation of the rollers in the variators, that is to say the ratio-varying components, of such CVT's.

FIG. 1 is a simplified representation of part of one known variator, viewed in a direction perpendicular to the common axis N of the two discs G and J. A single roller A, which will in practice be one of a set of three disposed at equal angular intervals around the axis N, transmits traction between part-toroidal races F and H in discs G and J respectively, and is mounted within a carriage C to rotate about a center and axis (B) both of which are defined by and fixed relative to the carriage. A rod P connects the carriage C to a piston D which has freedom to move axially within a fixed cylinder E, and also to tilt slightly as it does so without losing seal.

Such a variator has been found to work efficiently in a so-called "torque-controlled" CVT where a pressure generated hydraulically (by means not shown) in cylinder E exerts a force on piston D, which for equilibrium must balance the reaction force resulting from the resultant torque at the contact between the roller A and the races F and H. Roller A changes its angle of orientation (or "tilt angle"), and thus the ratio it transmits between discs G and J, by tilting about the axis of rod P, and it has been found that each position of the center of piston D, within its range of axial movement within cylinder E, correlates with a unique tilt angle of the roller A. In other words, each equilibrium tilt angle of the roller is uniquely defined by just three points, namely the locations of contact of the roller A with races F and H and the location of the centre of the piston D. Such a variator, and the CVT of which it is part, is described and shown in more detail in Patent EP-B-0444086.

As is well known in this art, the center of the roller is at all times constrained to follow the center circle of the torus to which races F and H conform. That center circle must lie in the mid-plane M of the torus. Rod P, which as already noted defines the tilt axis of the roller, is inclined to that plane at an angle L, known as the castor angle. The advantages of operating a toroidal-race variator with a substantial degree of castor angle, say of the order of 15°, are well known in the art.

It will be seen that in the apparatus of FIG. 1, as is typical in the prior art, the axis of movement of the component which applies the reaction force (the piston D) and the axis of tilt (the rod P) coincide at the third of the three points by which each angular setting of the roller is uniquely defined. This coincidence imposes constraints upon the location and orientation of certain components, particularly the cylinder E, and thus on the overall dimensions of the variator. For example, because the axis of cylinder E is inclined to the transverse mid-plane M by the castor angle L, the radius at which the cylinder is located relative to the disc axis N exceeds the radius of the discs themselves. If it did not, a corner of the cylinder would be at risk of fouling the disc J.

SUMMARY OF THE INVENTION

According to the present invention such constraints are diminished, thus providing greater freedom to locate the equivalent of cylinder E so as to minimise the overall dimensions of the variator, by separating the functions of reaction force generation and tilt control so as to avoid the two axes coinciding at the third point, in the manner just described. Such separation occurs also in the unusual CVT described in U.S. Pat. No. 3,933,054, but there the tilt control of each roller is achieved by a shaped slot, in which runs a pin fixed to the roller bearings and projecting in a direction coaxial with the roller itself. Such a construction has two particular disadvantages. Firstly that any pin-and-slot engagement is inherently liable to wear and friction. Secondly that the orientation and minimum length of the pin, relative to the roller, is such that whenever the two discs tend to move slightly in unison in either direction along their common axis, as they tend to do continually in use under varying loads, the consequent effect of the pin-and-slot engagement will be to cause the roller to tend to "steer" to a new tilt angle, thus changing the transmitted ratio although no such change has been demanded. The present invention relies on a different tilt control mechanism, which requires no pin-and-slot connection and which is inherently less prone to cause any ratio change in response to axial movements of the discs.

BRIEF DESCRIPTION OF THE DRAWING(S)

The present invention is defined by the claims, the contents of which are to be read as included within the description of this specification, and the invention will now be described by way of example with reference to the following further figures of diagrammatic drawings in which:

DESCRIPTION OF THE PREFERRED EMBODIMENT(S)

Figure 1:
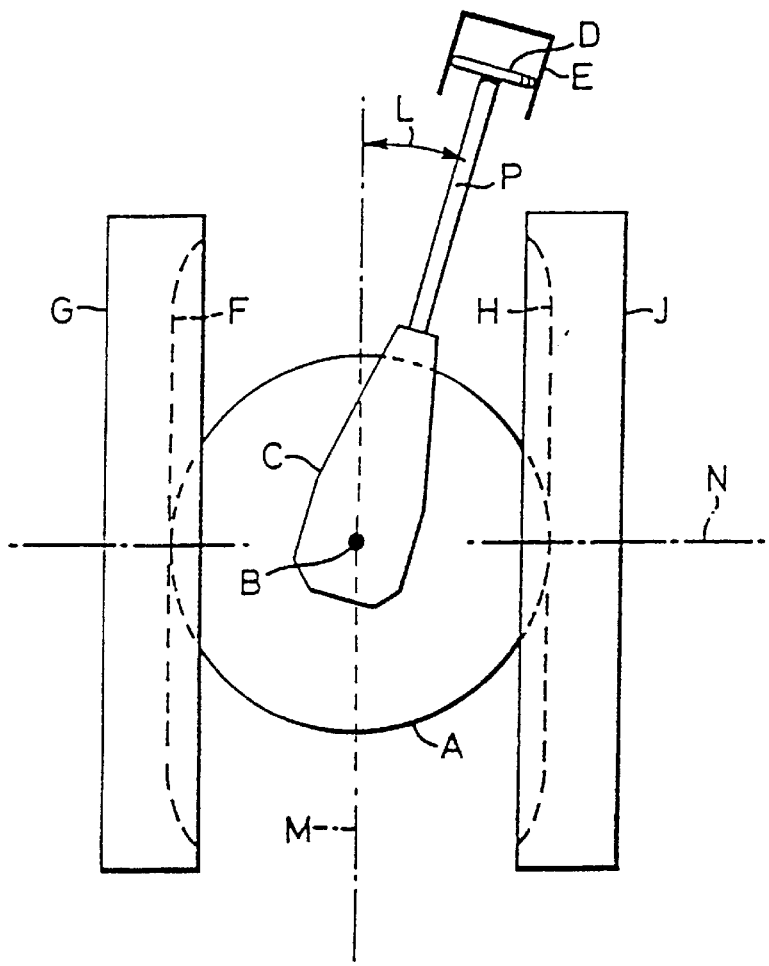
FIG. 1 is a prior art viewed in a direction perpendicular to the common axis of discs.
Figure 2:
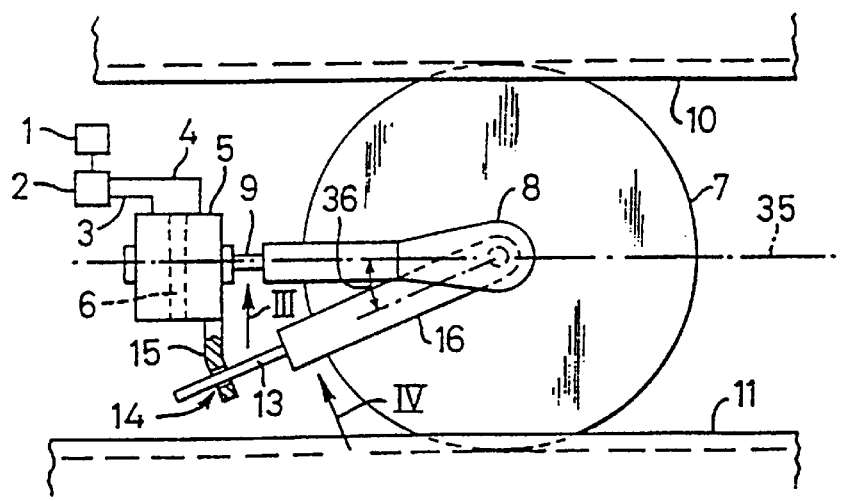
FIG. 2 shows one roller control mechanism. viewed along the axis of the roller.
Figure 3:
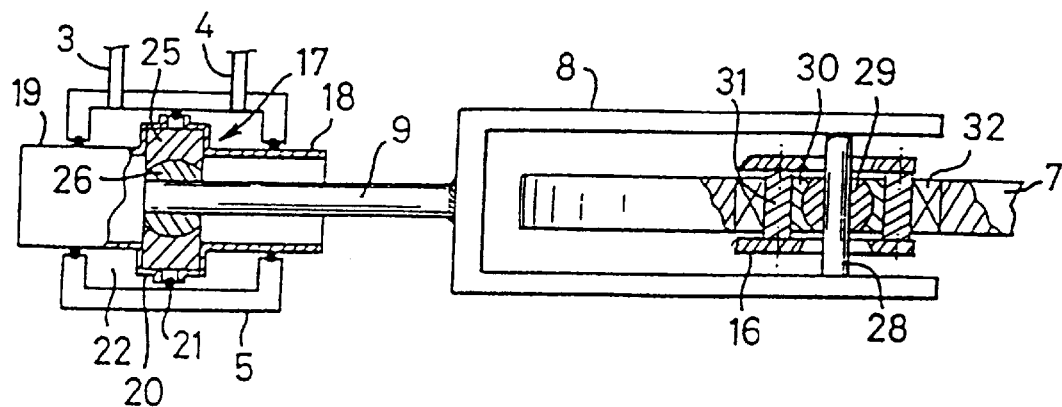
FIG. 3 is a partial view in the direction of the arrow III in FIG. 2.

FIG. 2 shows a source 1 of hydraulic power connected, by way of conduits 3, 4 and of a central programmed control system 2 of a kind appropriate to torque control, to opposite ends of a cylinder 5 containing a piston 6. The roller 7 is rotatably mounted within a carriage 8, which is attached to the piston 6 by way of a rod 9. Items 7, 8, 9 and 6 correspond with items A, C, P and D in FIG. 1 to the extent that the hydraulic forces generated within cylinder 5 are controlled so as to balance the torque reaction forces generated at the contacts between the roller 7 and discs 10 and 11, so bringing the CVT into equilibrium with the roller at the tilt angle appropriate to that torque reaction. In FIG. 1, however, both the center of roller A and its axis of rotation were fixed relative to carriage C. In FIG. 2, as will be further explained, the carriage 8 determines only the center of rotation of the roller. Its axis of rotation, and thus also the perpendicular tilt axis about which it tilts to change ratio, is determined by a rod 13 which can slide through, but is radially constrained by, an aperture 14 formed in a member 15 which is either fixed to or part of the fixed structure of the CVT. In FIGS. 2 and 3 it is shown fixed to cylinder 5.

FIG. 3 shows that piston 6 comprises a two-part cylindrical sleeve 17, the ends 18, 19 of which pass through sealed apertures in the opposite end walls of cylinder 5. The sleeve 17 also has a central part 20 of enlarged diameter, which carries a seal 21 and thus moves as a piston within the central chamber 22 of cylinder 5. Within the central part 20 of the sleeve 17 fits a ring 25, in the middle of which a member 26 is free to rotate in the manner of a spherical bearing. Rod 9 is fixed to member 26. This form of piston is thus essentially of a kind shown in more detail in patent publication WO 92/11475 and has the advantage that the rod 9 is free to rotate through a conical angle but is out of contact with the hydraulic fluid in cylinder 5, so avoiding the need there would be for flexible seals around the rod if it were attached to a conventional piston, and was therefore exposed to the cylinder fluid.

Figure 4:
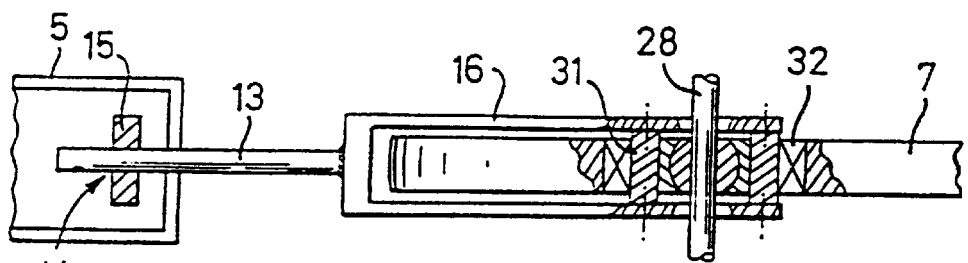
FIG. 4 is another partial view, in the direction of the arrow IV in FIG. 2.

As FIG. 3 also shows, carriage 8 supports roller 7 by way of a rod 28 to which is fixed the inner half 29 of a spherical bearing. Thus, as has already been said, carriage 8 fixes only the centre and not also the axis of rotation of roller 7. As FIGS. 3 and 4 together show, the outer half 30 of the spherical bearing is held by the inner wall of a sleeve 31 which is attached (by way of a second carriage 16 which fits with good clearance within the jaws of carriage 8) both to the rod 13 and to a ball race 32 about which the roller 7 spins.

Because of the two spherical joints at 25/26 and 29/30 the piston/cylinder combination 5/6, which can be regarded as a first part of the roller operating mechanism, can exert thrust on the roller 7 to balance its reaction forces against the discs 10 and 11, but cannot define the ratio angle adopted by the roller. In contrast the rod 13 and associated parts, together constituting a second part of the operating mechanism, can exert no such thrust, but define both the axis about which the roller tilts to change ratio and the angle (the "castor angle" 36) which that axis makes with the torus mid-plane 35.

In terms of the explanation of the operation of a torque-controlled CVT given in the third paragraph of this specification, in FIG. 2 each equilibrium tilt angle of the roller 7 now correlates with a unique triangle of which the fixed aperture 14 is always the vertex, but the locations of the two roller/disc contacts and the distances between each of those contacts and the vertex are unique. It should also be noted that the axes of rod 13 and roller 7 are coplanar and intersect at the roller center, so reducing to a minimum any steer effect that the rod will impose on the roller in response to axial movements of the discs 10, 11 under load.

In FIG. 2 the axis of cylinder 5 is shown aligned with the torus mid-plane 35: alternatively, it could for instance be offset from that plane but parallel to it. Because the cylinder axis is no longer aligned with the roller tilt axis (as it is, for instance, in the detailed embodiments of EP-B-0444086) the structure of cylinder 5 can now be located with more freedom, and notably at a substantially smaller radius relative to the common axis of the discs, and the relative simplicity of the rod 13 and the other parts that define the tilt axis enable them to be located at a smaller radius still. Possibly, as indicated in FIG. 2, the entire structure of the cylinder 5, the rod 13 and the member 15 may be accommodated within the imaginary cylinder of which the two discs 10 and 11 constitute the end walls.

Figure 5:
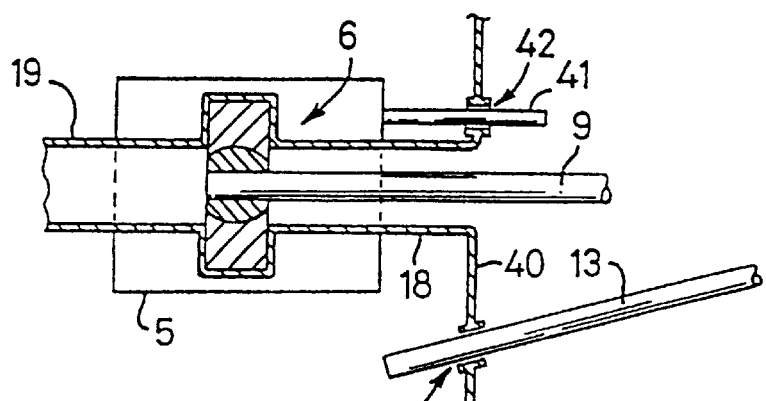
FIG. 5 shows part of another embodiment of the invention.

In the alternative construction shown in outline in FIG. 5 the aperture 14, instead of being formed in a member 15 fixed to the structure of the CVT as a whole, is now formed in a flange 40 formed at the forward tip of end 18 of the sleeve 17. The aperture 14 therefore moves with the piston 6, and each equilibrium tilt angle of the roller 7 (not shown in FIG. 5) correlates with a trio of unique locations, namely the two roller/disc contacts and the instantaneous location of the aperture 14, which of course now reflects the position within its stroke of the piston 6. With this embodiment, it is necessary to ensure that the aperture 14 follows a predetermined path as the piston 6 moves back and forth. This would not be assured if the piston 6 were of conventional, circular outline and were free to rotate, as well as move axially, relative to the cylinder 5. Such rotation can be prevented, and the predetermined movement of aperture 14 therefore assured, by a guide pin 41 projecting axially forward from the structure of the cylinder 5 and passing through a second aperture 42 in the flange 40. Alternatively rotation could be prevented by making the end 18 of sleeve 17 of non-circular outline where it passes through the front wall of the cylinder 5.

We claim:

1. A roller control system, for a continuously-variable-ratio transmission, comprising a pair of spaced apart discs defining a torus mid-plane therebetween; the roller control system further including a roller being located between the pair of spaced apart discs, the roller having a tilt angle, a roller rotational plane, roller bearings to facilitate rotation of the roller, and the roller bearing being located at a roller center; and an operating mechanism for controlling a position of the center of the roller along the torus mid-plane and for controlling the tilt angle of the roller;

wherein said operating mechanism has:

a first mechanical link operable to control said position of the roller center along said torus mid-plane but incapable of controlling said tilt angle of the roller; and a second mechanical link connected to said roller bearings and operable to control the tilt angle of the roller, and the second mechanical link lies substantially parallel to the plane of the roller and is constrained to pass through a predetermined single point fixed relative to a structure of the transmission.

2. The roller control system according to claim 1, wherein the first mechanical link comprises a piston movable along an axis parallel to the torus mid-plane.

3. The roller control system according to claim 2, wherein the piston has a piston axis and said piston axis lies in the torus mid-plane.

4. The roller control system according to claim 2, wherein the piston includes a piston axis and the piston is prevented from rotating about the piston axis.

5. The roller control system according to claim 1, wherein the second mechanical link is substantially coplanar with the roller.

6. The roller control system according to claim 1, wherein the second mechanical link of the operating mechanisms lies at no greater radius, from the center of the roller than the first mechanical link.

7. The roller control system according to claim 1, wherein the second mechanical link of the operating mechanism lies at no greater radius, from the center of the roller than the first mechanical link and both parts of the operating mechanism lie wholly within the radius of the discs between which the roller is transmitting traction.

* * * * *